United States Patent [19]
O'Callaghan

[11] Patent Number: 6,155,709
[45] Date of Patent: Dec. 5, 2000

[54] BLENDING APPARATUS

[75] Inventor: James Joseph O'Callaghan, Dundalk, Ireland

[73] Assignee: Vervant Limited, Dublin, Ireland

[21] Appl. No.: 08/718,092

[22] Filed: Sep. 11, 1996

[30] Foreign Application Priority Data

Sep. 11, 1995 [IE] Ireland .................................. S950704

[51] Int. Cl.[7] .................................................. B01F 15/04
[52] U.S. Cl. ..................... 366/141; 366/151.1; 366/177.1
[58] Field of Search ................................ 366/141, 152.1, 366/152.2, 152.6, 153.1, 154.2, 177.1, 179.1, 181.1, 181.3, 182.1, 183.1

[56] References Cited

U.S. PATENT DOCUMENTS

| | | | |
|---|---|---|---|
| 3,314,398 | 4/1967 | Legourd ................................ | 366/154.2 |
| 3,638,916 | 2/1972 | Ursic et al. .............................. | 366/141 |
| 4,353,482 | 10/1982 | Tomlinson et al. ..................... | 366/141 |
| 4,459,028 | 7/1984 | Bruder et al. ......................... | 366/181.1 |
| 4,544,279 | 10/1985 | Rudolph ................................ | 366/177.1 |
| 4,830,508 | 5/1989 | Higuchi et al. ...................... | 366/152.1 |
| 4,895,450 | 1/1990 | Holik ..................................... | 366/141 |
| 5,219,224 | 6/1993 | Pratt ..................................... | 366/154.2 |
| 5,240,324 | 8/1993 | Phillips et al. ......................... | 366/141 |
| 5,452,954 | 9/1995 | Handke et al. ...................... | 366/152.1 |
| 5,527,107 | 6/1996 | Weibel et al. .......................... | 366/141 |

FOREIGN PATENT DOCUMENTS

| | | |
|---|---|---|
| 1403607 | 8/1975 | United Kingdom . |
| 2110100 | 6/1983 | United Kingdom . |
| 2256931 | 12/1992 | United Kingdom . |

Primary Examiner—Tony G. Soohoo
Attorney, Agent, or Firm—Jacobson, Price, Holman & Stern, PLLC

[57] ABSTRACT

A blending apparatus has a primary additive feed hopper and secondary additive feed hoppers suspended from load cells on a support frame. Additive materials are delivered from the hoppers to a discharge chute for delivery to a material processing device such as a plastics extrusion device. A controller associated with the blending apparatus monitors the throughput of process material in the extrusion device and the discharge rate of additives from the hoppers and controls the process material throughput for controlling blending of the feed additives with the process material.

20 Claims, 10 Drawing Sheets

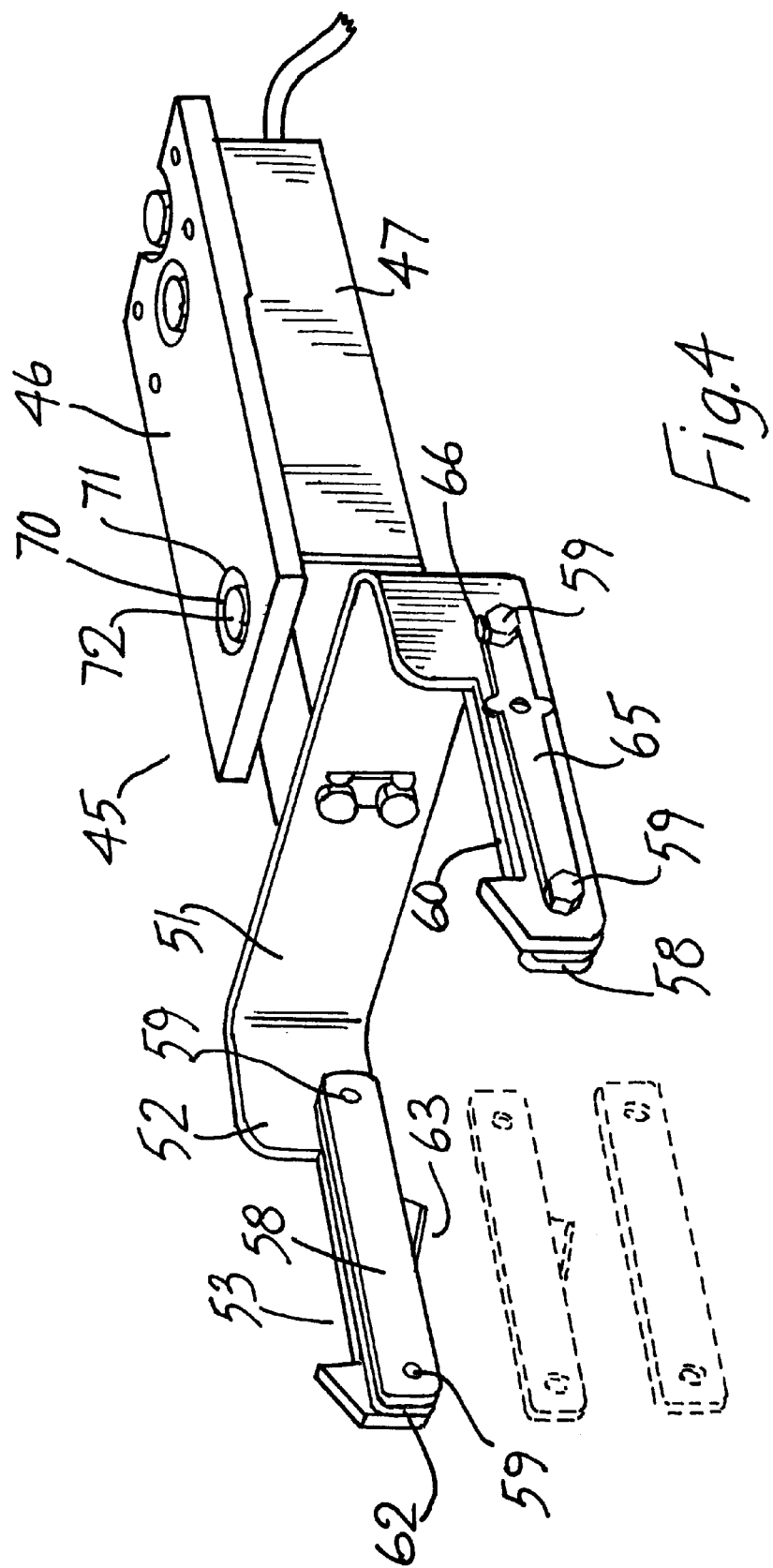

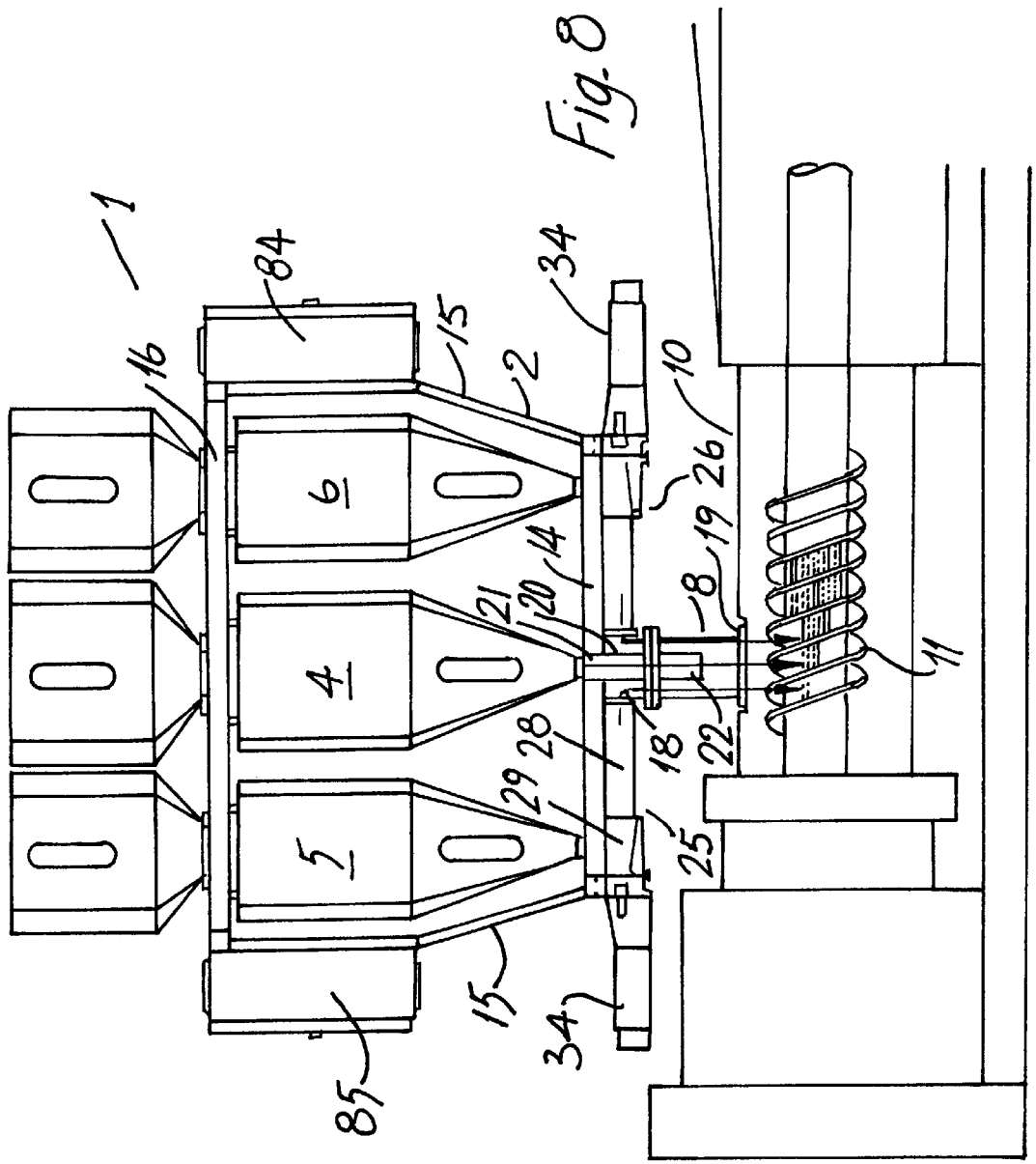

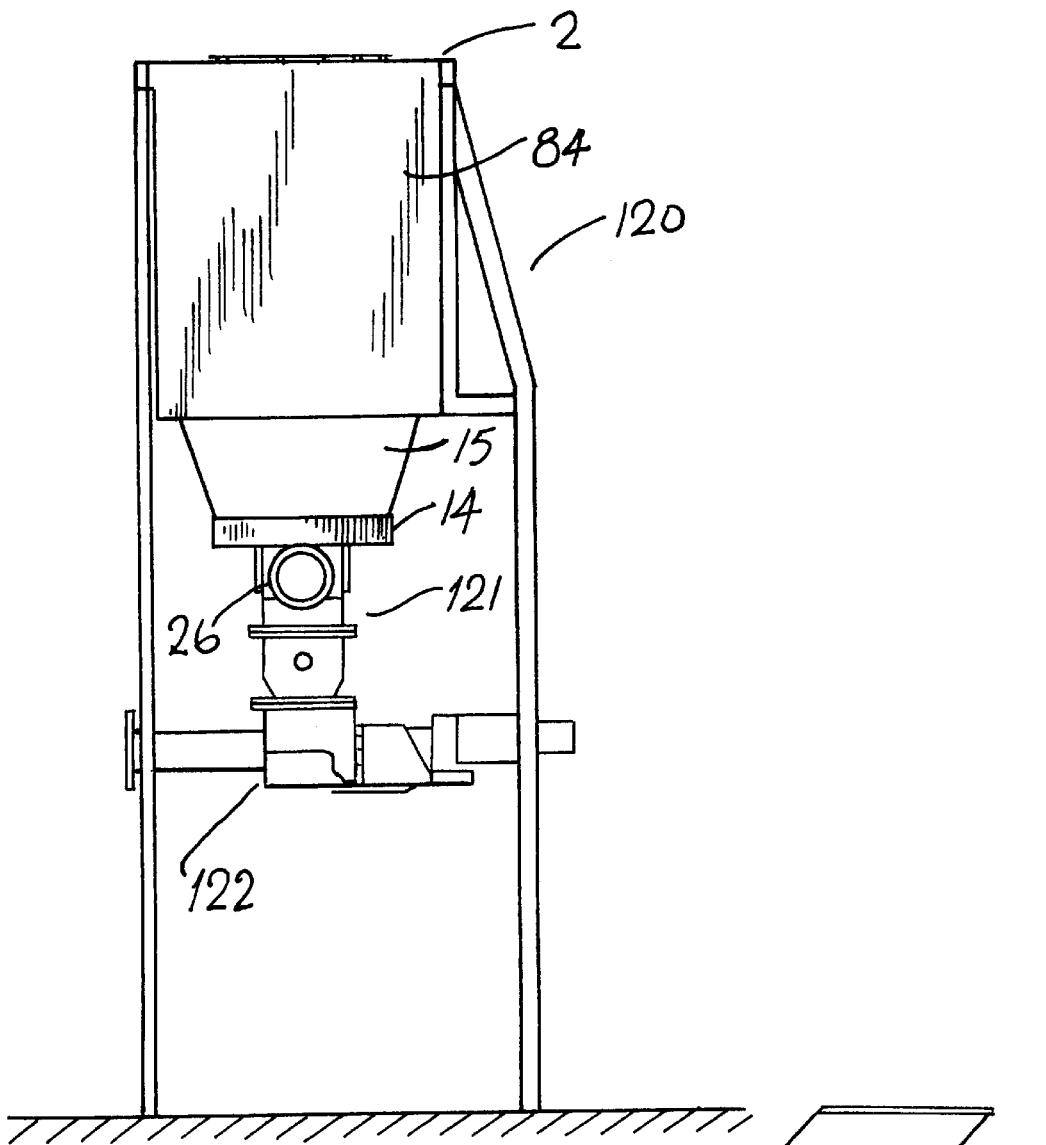
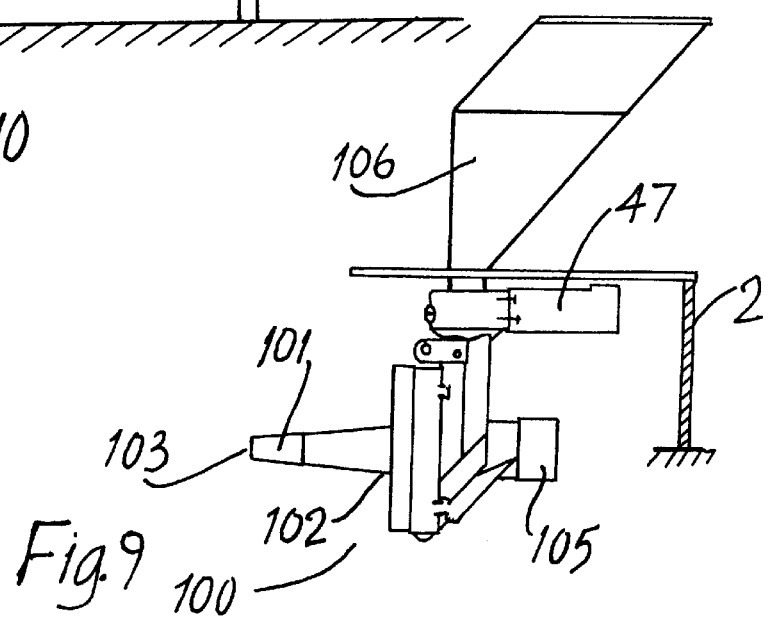
Fig. 10
Fig. 9

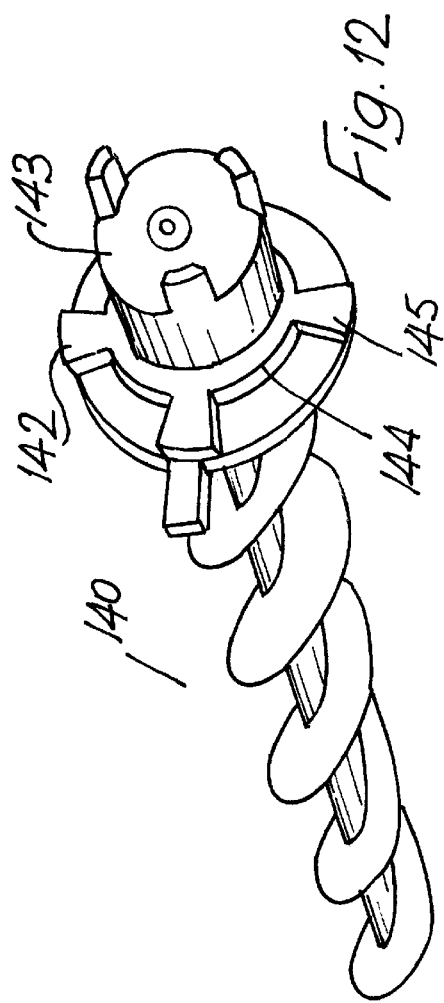
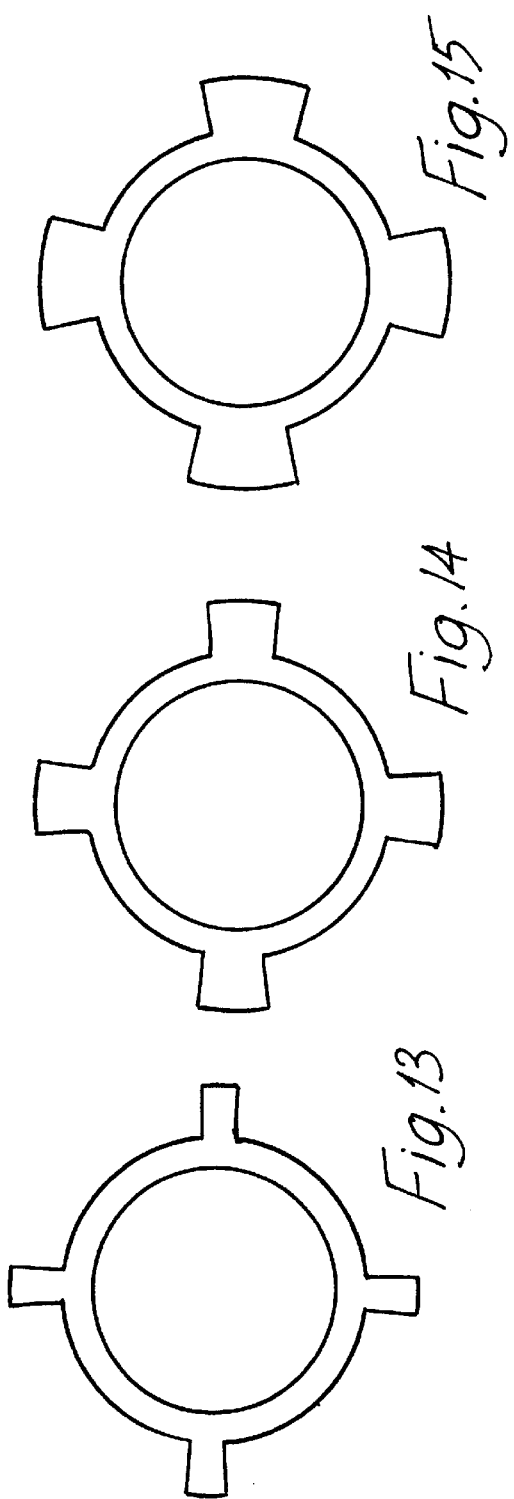

BLENDING APPARATUS

This invention relates to a blending apparatus and method.

The invention particularly relates to a blending apparatus for controlled delivery of blend additives into a material processing device such as a plastics extruding device, or in processes requiring accurate blending of material.

It is known to provide a blender for supplying a mixture of different additives to a plastic extrusion device. One type of blender has hoppers for a number of additives, each hopper having an auger operable for delivering metered quantities of selected additives in a desired ratio to a mixing chamber in which the required mixture is formed, the mixture being subsequently delivered from the mixing chamber to the extrusion device at a desired rate. This blender is, however, of relatively complex construction making it relatively expensive to manufacture and somewhat unreliable in operation particularly where working conditions are not ideal. Uneven blending of additives can occur due to uneven mixing or separation of additives after blending or within the mixing chamber which adversely affects product quality. Further, at the and of each production run, pre-blended material within the mixing chamber may be wasted. This waste can be particularly significant where a large number of different products are being produced using different blends Also, because of the relatively complex construction, it is difficult and time consuming to clean out the blender between different production runs with consequent losses due to downtime of the plastic extrusion device or other process or apparatus with which the blender is used.

The present invention is directed towards providing an improved blending apparatus which overcomes these problems.

According to the invention there is provided a blending apparatus for controlled delivery of blend additives to a material processing device, comprising a primary additive feed hopper, having an additive inlet and an additive outlet, at least one secondary additive feed hopper, each secondary additive feed hopper having an additive inlet and an additive outlet, an additives discharge chute having an inlet and an outlet, the inlet being connected to each hopper outlet, the outlet for connection to a material processing device, each hopper having means for delivery of additives from the hopper to the inlet of the discharge chute, each hopper having means for sensing discharge of additives from each hopper, each sensing means being connected to a controller, the controller being operable for regulating simultaneous discharge of additive material from selected hoppers in a pre-selected ratio to the discharge chute.

In a particularly preferred embodiment of the invention, there is provided a blending apparatus for controlled delivery of blend additives to a material processing device, comprising a primary additive feed hopper and at least one secondary additive feed hopper, an additives discharge chute having an upper inlet end and a lower outlet end, the outlet end for connection to an additive inlet of the material processing device, a primary additive feed pipe having an inlet end and an outlet end, the outlet end of the primary additive feed pipe opening into the additives discharge chute, an outlet of the primary additive feed hopper communicating with the inlet end of the primary additive feed pipe, each secondary additive feed hopper having an associated feeding means with an inlet for reception of material from the secondary additive feed hopper and an outlet communicating with the additives discharge chute for delivering material from the secondary additive feed hopper into the additives discharge chute, means being provided for sensing the throughput of material in the material processing device and means being provided for sensing discharge of additives from the feed hoppers, both said means being connected to a controller for regulating the throughput of material through the material processing device in response to the sensed discharge of material from the feed hoppers.

Preferably, the feeding means outlet communicates with the additives discharge chute at a location above the outlet is end of the primary additive feed pipe for delivering material from the secondary additive feed hopper into the additives discharge chute between an exterior of the primary additive feed pipe and an interior of the additives discharge chute, In a further embodiment one or more of the hoppers have a vibrator rod suspended within the hopper, the rod having associated vibrator means operable to vibrate the rod within the hopper.

In another embodiment, the means for sensing discharge of additives from each feed hopper is a load cell mounted on a support frame, the feed hopper being hung from a cantilevered hopper carrying fork mounted on the load cell, the hopper carrying fork being U-shaped having an inner end attached to the load cell with a pair of spaced-apart outwardly extending hopper support arms, each arm having a groove in an upper surface of the arm, each hopper having a pair of spaced-apart hanging plates mounted at an upper end of the hopper, each hanging plate having an out-turned flanged upper end for engagement within the groove to suspend the hopper on the arms.

Preferably, an adjustment plate is mounted on each arm by means of adjustment screws which pass through complementary adjustment slots in the arm and engage threaded holes in the adjustment plate for adjustment of the adjustment plate on the arm, an upper edge of each adjustment plate forming a support for the hopper hanging plate.

In a further embodiment, a centring plate is mounted on each arm having an inwardly extending central lug for engaging the hanging plates for positioning the hopper is between the arms.

Preferably, the load cell is mounted on a bottom face of a carrier plate, a top face of the carrier plate abutting a horizontal support surface on the support frame to which the carrier plate is secured, the load cell having a fixed inner end attached to the carrier plate and a free outer end on which the hopper carrying fork is mounted, a safety bolt being mounted at a free end of the load cell and housed within an associated stepped socket in the carrier plate, a head of the bolt movable vertically within the socket between the horizontal support surface and a stepped shoulder in the socket defining deflection limits for the load cell.

In another embodiment, each feeding means comprises a screw feeder having a screw shaft rotatably mounted within a cylindrical housing extending radially outwardly from the extruder supply pipe, the screw shaft having a drive head at an outer end of the screw shaft engaged by a complementary motor drive head on a drive motor for the shaft, the drive heads being releasably engageable.

Conveniently, the motor is movable between an engaged position for driving the screw shaft and a retracted disengaged position.

Ideally, the motor is hingedly mounted on the housing adjacent the outer end of the screw shaft for movement between the engaged and disengaged position.

In a further embodiment, the feeding means comprises a rotatable discharge cone device, having a conical body which tapers inwardly between an inlet end and an outlet end of the body with drive means for rotation of the body, the inlet end for reception of material from the secondary additive feed hopper and the outlet end communicating with the additives discharge chute.

Preferably, the discharge cone device is mounted on the load cell together with the feed hopper.

In another embodiment a low level sensor is mounted in the additives discharge chute, the low level sensor being connected to the controller, the controller operating the delivery means at selected hopper outlets for delivering a pre-set charge of additives to the discharge chute in response to a sensed low level in the discharge chute, the controller operating each delivery means for a pre-set time period and varying the speed of each delivery means for simultaneously delivering additives from the hoppers to the chute in a pre-selected desired ratio.

In a further embodiment the apparatus has means for identifying the feeding means associated with a hopper, said identifying means being connected to the controller.

Preferably, the feeding means is a screw feeder having a screw shaft rotatably mounted within a cylindrical housing, and the identifying means is an identity means on the screw shaft corresponding to the screw shaft and a complimentary sensor connected to the controller and mounted adjacent to the screw shaft for co-operation with the identity means to indicate to the controller which screw shaft is mounted in the housing.

In another aspect, the invention provides a method for delivering additives to a material processing device, comprising the steps;

continuously delivering a primary additive material under gravity from a primary additive feed hopper through a feed pipe to an additives discharge chute having an outlet end connected to an additives inlet of the material processing device, the feed pipe being mounted co-axially within the additives discharge chute with an outlet end of the feed pipe terminating intermediate an inlet end and an outlet end of the additives discharge chute, continuously delivering a secondary additive material from a secondary additive feed hopper through a feeder means to the additives discharge chute, sensing the rate at which primary additive material is discharged from the primary additive feed hopper, sensing the rate at which the secondary additive material is discharged from the secondary additive feed hopper, sensing throughput of process material in the material handling device, and controlling the process material throughput in response to the sensed primary additive material discharge rate for controlling blending of the feed additives with the process material.

The invention will be more clearly understood by the following description of some embodiments thereof, given by way of example only, with reference to the accompanying drawings, in which;

FIG. 4 is a detail perspective view showing a load cell assembly used in the apparatus;

FIG. 8 is a schematic elevational view of the blending apparatus in use mounted on a plastics extrusion device;

FIG. 9 is a side elevational view of an alternative feeder device for the apparatus;

FIG. 10 is a side elevational view of another blending apparatus;

Figure 11:
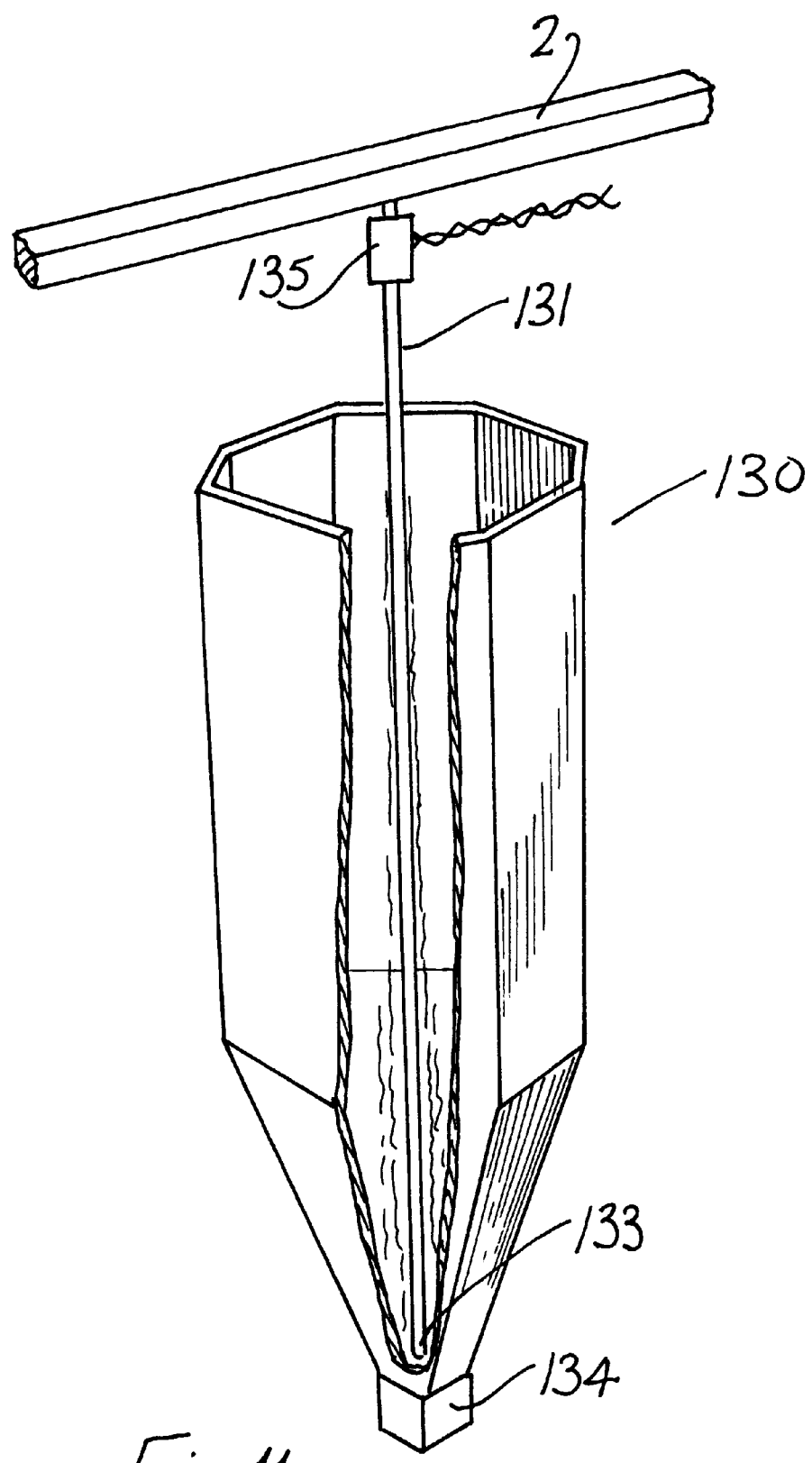

FIG. 11. is a detail partially cut-away perspective view of a hopper forming porting of another blending apparatus;

FIG. 12. is a perspective view of a screw shaft used in the blending apparatus;

FIG. 13. is an elevational view an identity collar for the screw shaft of FIG. 12;

FIG. 14. is a view similar to FIG. 13. showing an alternative identity collar;

FIG. 15. is another view similar to FIG. 13, of a further identity collar; and

Figure 16:
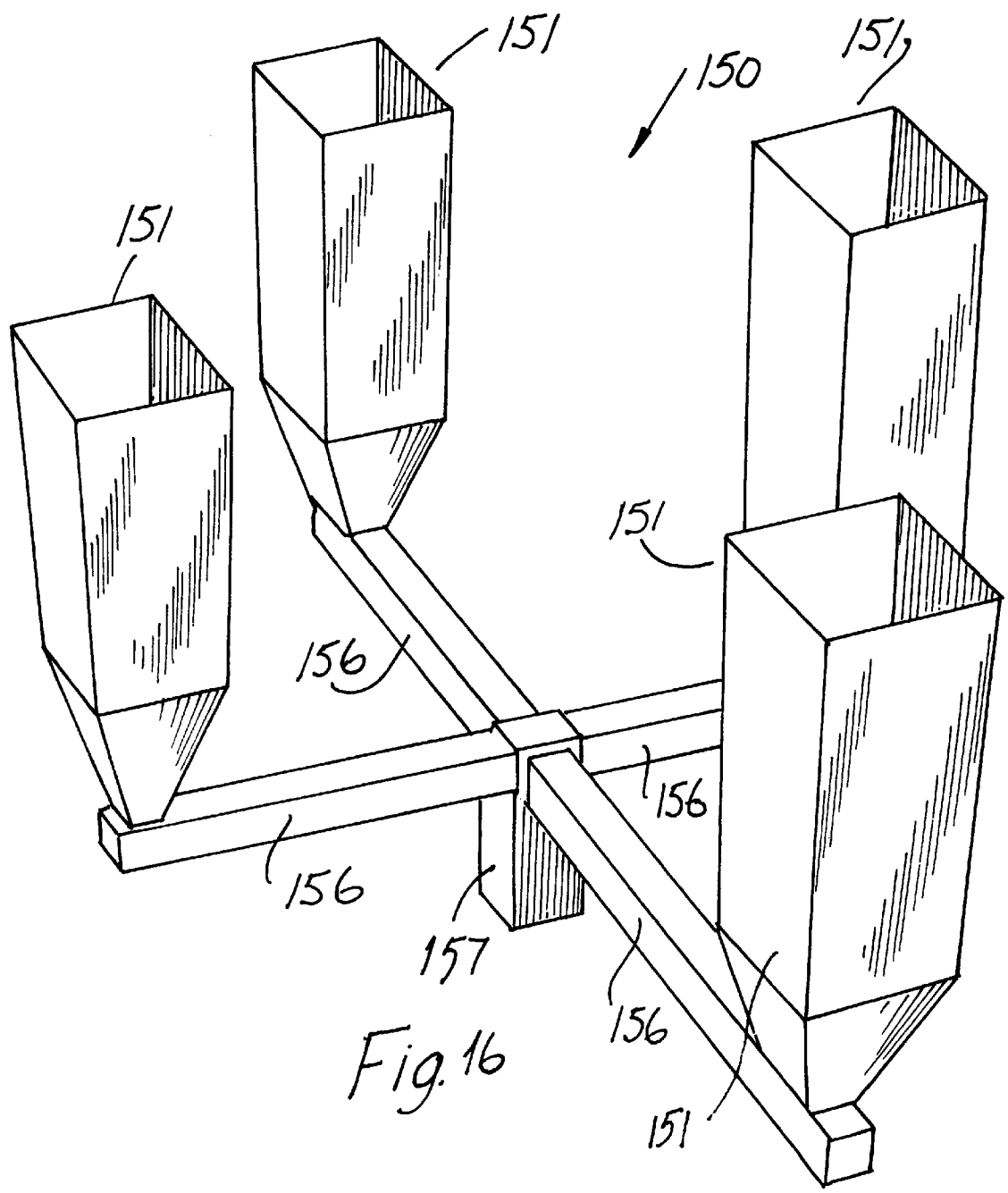

FIG. 16. is a diagrammatic perspective view of portion of another blender according to the invention.

Referring to the drawings, and initially to FIGS. 1 to 8 thereof, there is illustrated a blending apparatus according to the invention and indicated generally by the reference numeral 1 the blending apparatus 1 in this case for blending three materials. The blending apparatus 1 comprises a rigid support frame 2 on which three hoppers, namely, a primary additive feed hopper 4 and two secondary additive feed hoppers 5, 6 are mounted. Materials from the feed hoppers 4, 5, 6 are fed through a vertical additives discharge chute 8 for delivery of additive materials to a material processing device such as a plastics extrusion device 10 for example (see FIG. 8) on which the blending apparatus 1 is mounted in use.

The support frame 2 is of rigid construction comprising a base 14 with upstanding side walls 15 at each end of the base 14. Upper ends of the side walls 15 are interconnected by a top panel 16. The additives discharge chute 8 extends vertically downwardly from the base 14 directly beneath the primary additive feed hopper 4 and has an upper inlet end 18 and a lower outlet end 19.

As can be seen in FIG. 8, a primary additive feed pipe 20 is vertically mounted on the base 14 having an upper inlet end 21 and a lower outlet end 22. It will be noted from FIG. 8 that the feed pipe 20 is mounted co-axially within the additives discharge chute 8 with the outlet end 22 of the feed pipe 20 terminating intermediate the ends 18, 19 of the additives discharge chute 8.

Extending radially outwardly at the inlet end 18 of the additives discharge chute 8 are feeder means in this case comprising a pair of screw feeders 25, 26 associated with the secondary feed hoppers 5, 6 respectively. Each screw feeder 25, 26 comprises a screw shaft 27 (FIG. 5) rotatably mounted within a cylindrical housing 28 having an inlet end 29 beneath an associated feed hopper 5, 6 and an outlet end 30 connected to the upper end 18 of the additives discharge chute 8. In alternative embodiments of the invention, other feeder means may be used such as belt or vibration feeders.

In the drawings, only two screw feeders 25, 26 are shown mounted at opposite sides of the additives discharge chute 8. However, it will be noted that either one or two additional screw feeders with associated feed hoppers may be mounted at the upper inlet end 18 of the additives discharge chute 8. These additional screw feeders can be mounted extending radially outwardly at a front and/or rear of the additives discharge chute 8 which has appropriate additional inlet openings closed by cover plates 31 when not in use. Further, it is envisaged that in some cases instead of the four-sided discharge chute 8 shown in the drawings, other multi-sided discharge chutes may be provided, having for example five, six or more sides, to allow for additional material feeders.

Figure 1:
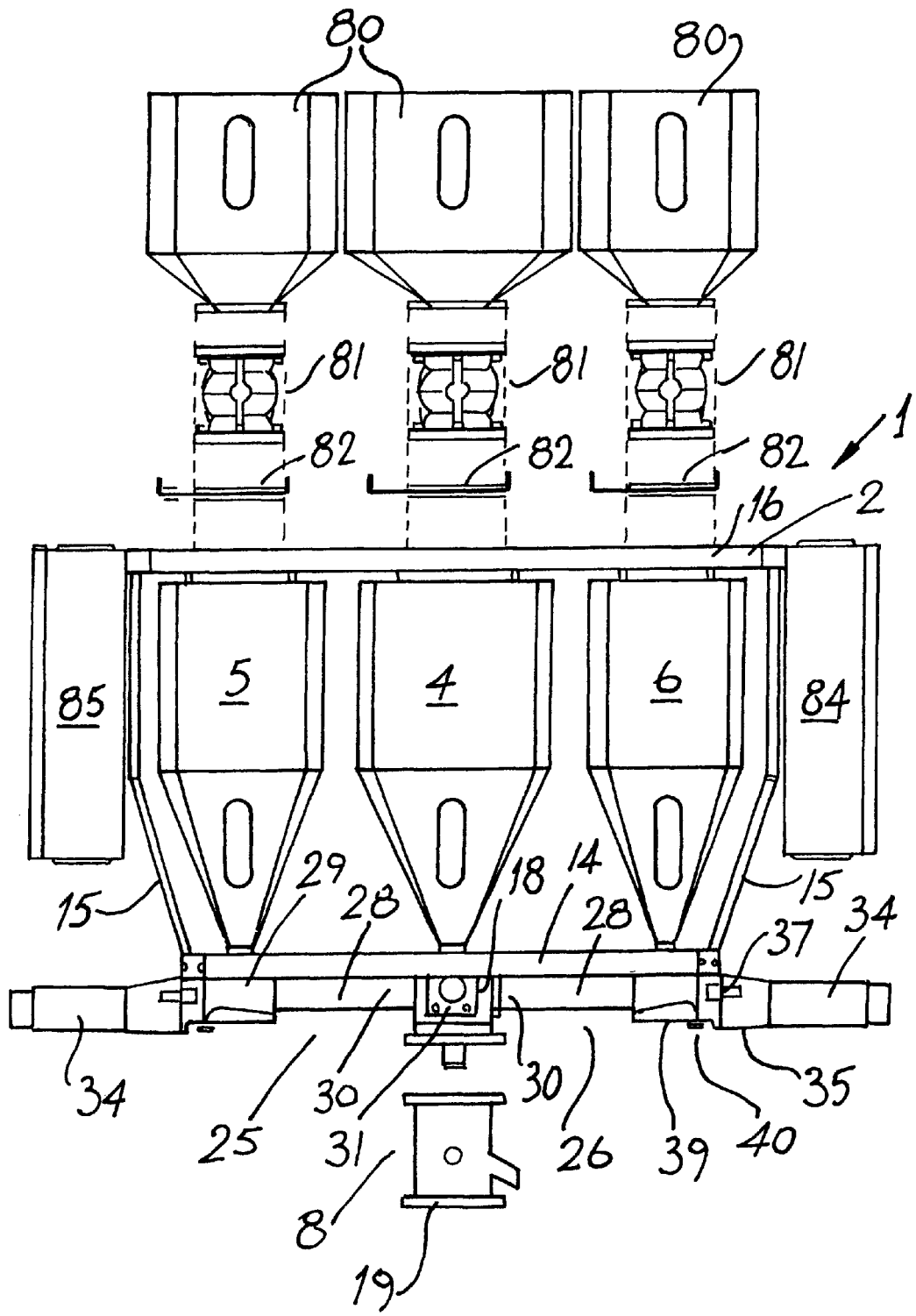
FIG. 1 is an exploded front elevational view of a blending apparatus according to the invention.
Figure 2:
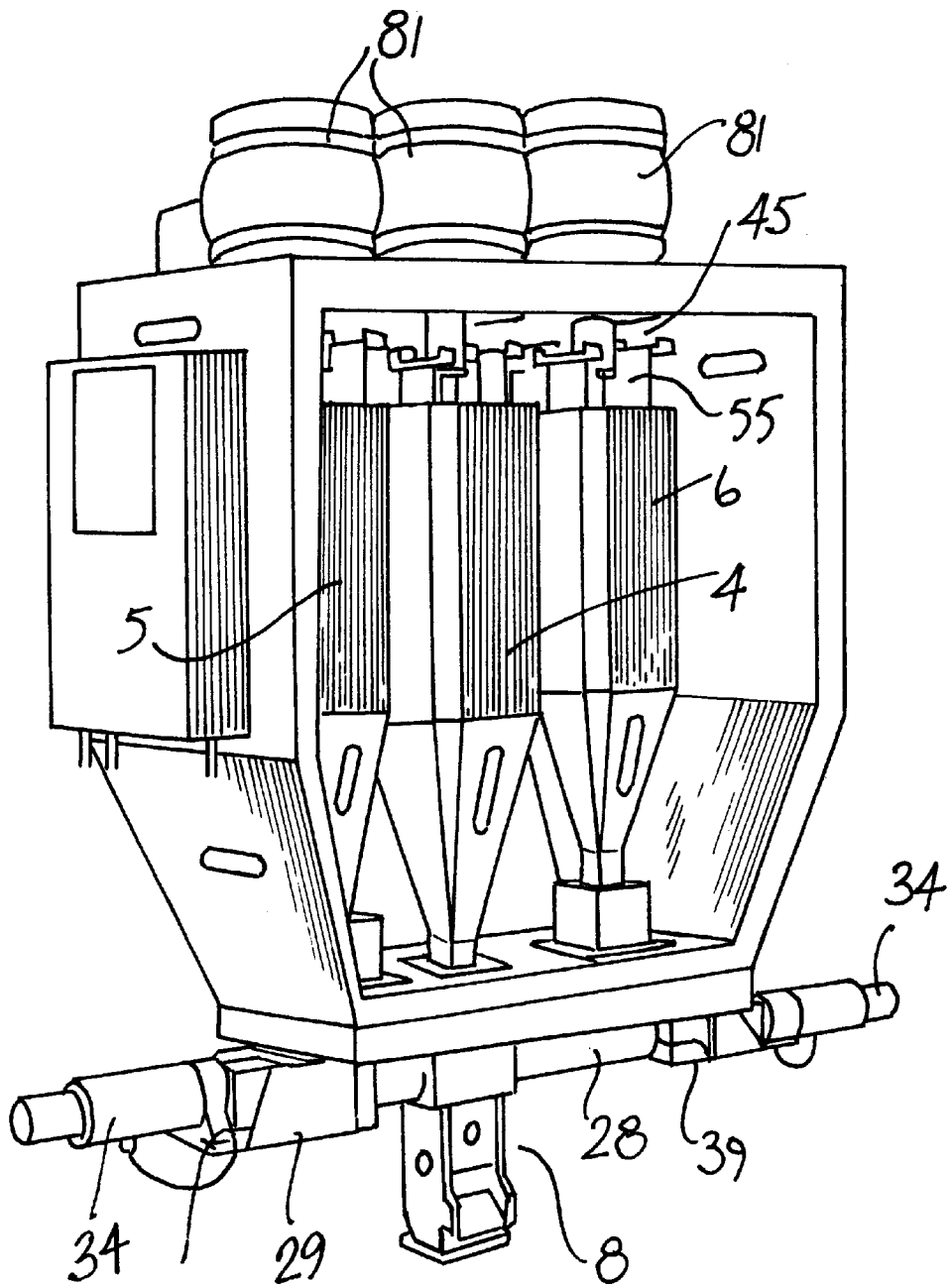
FIG. 2 is a perspective view of the blending apparatus.
Figure 6:
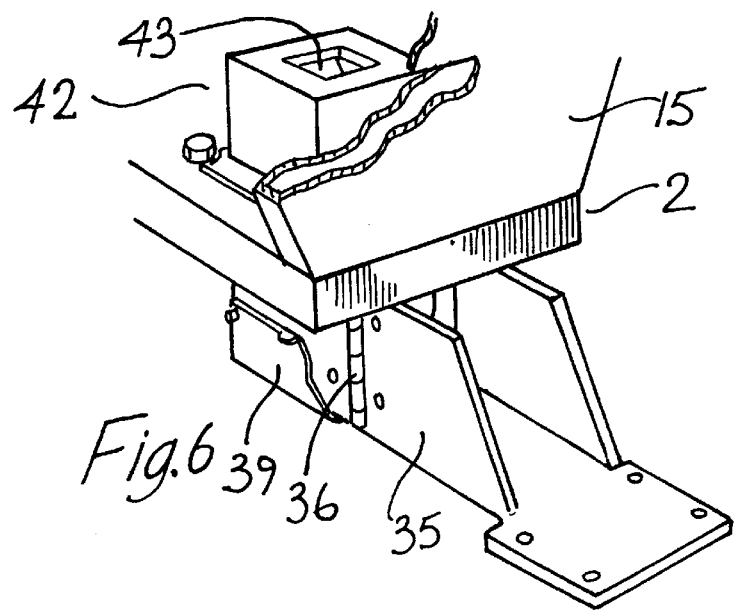
FIGS. 6 and 7 are detail perspective views of portion of the apparatus.
Figure 7:
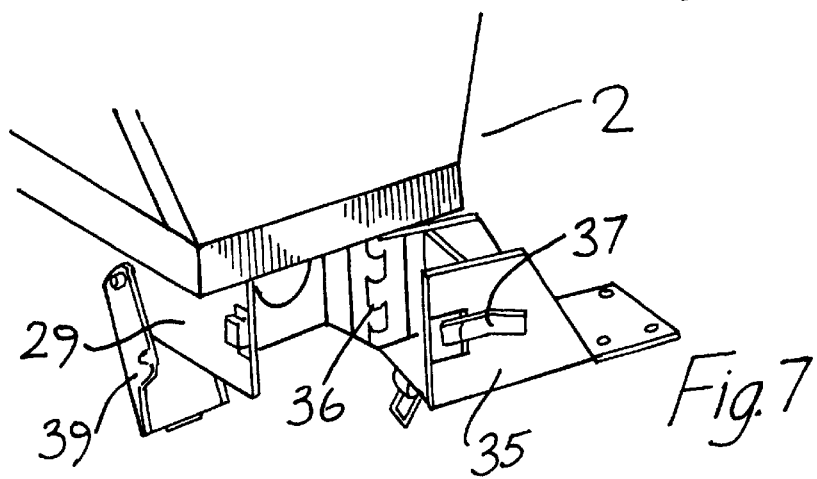
Figure 5:
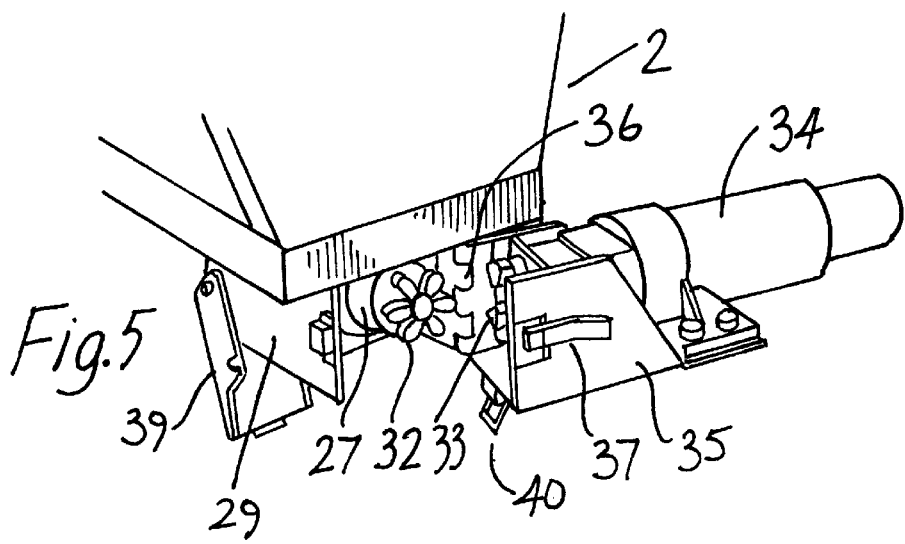
FIG. 5 is a detail perspective view showing a feed screw portion of the apparatus.

Referring to FIGS. 5 to 7, each screw shaft 27 has a drive head 32 at an outer end of the screw shaft 27 engaged by a complementary motor drive head 33 on a drive motor 34 for the screw shaft. As can be seen in FIG. 5, the motor 34 is carried on a mounting bracket 35 which is mounted by a hinge 36 at the inlet 29 for movement of the motor 34 between a retracted disengaged position as shown in FIG. 5 and a closed engaged position as shown in FIG. 1 in which the drive heads 32, 33 interengage to drive the screw shaft 27. A quick-release catch 37 is provided on a side of the mounting bracket 35 for securing the mounting bracket 35 in the closed position. It will be noted that the screw shaft 27 is mounted within an associated plastics barrel which is slidably received within the cylindrical housing 28 releasably held within the housing 28 by a locknut which engages the barrel through a side wall of the housing. In this way, the screw shaft 27 can be readily easily and quickly removed for cleaning or the barrel and screw shaft changed for handling different types of additive.

The blending apparatus 1 also has identification means (not shown) which automatically senses the type of screw shaft 27 installed in each housing 28, and also means for monitoring the actual speed of rotation of the screw shaft 27, each of said means being connected to a controller for the blending apparatus 1. Furthermore, an inspection window may be provided in a side wall of the inlet 29 allowing visual monitoring of the screw shaft 27.

At a lower end of the inlet 29, a drain flap 39 is hingedly mounted to allow drainage of material from a hopper 5, 6 straight through the inlet 29 if required, at the end of an extrusion run for example, when changing over additives. The flap 39 is held in the closed position by a quick-release catch 40 (see FIG. 1) engageable between a free end of the flap 39 and an underside of the mounting bracket 35.

Referring to FIG. 6, at an entrance to each inlet 29, a flow director 42 is preferably provided. The flow director 42 has internal walls 43 which flare outwardly and downwardly, a lower outlet end of the hoppers 5, 6 being located within the flow director 42.

Figure 3:
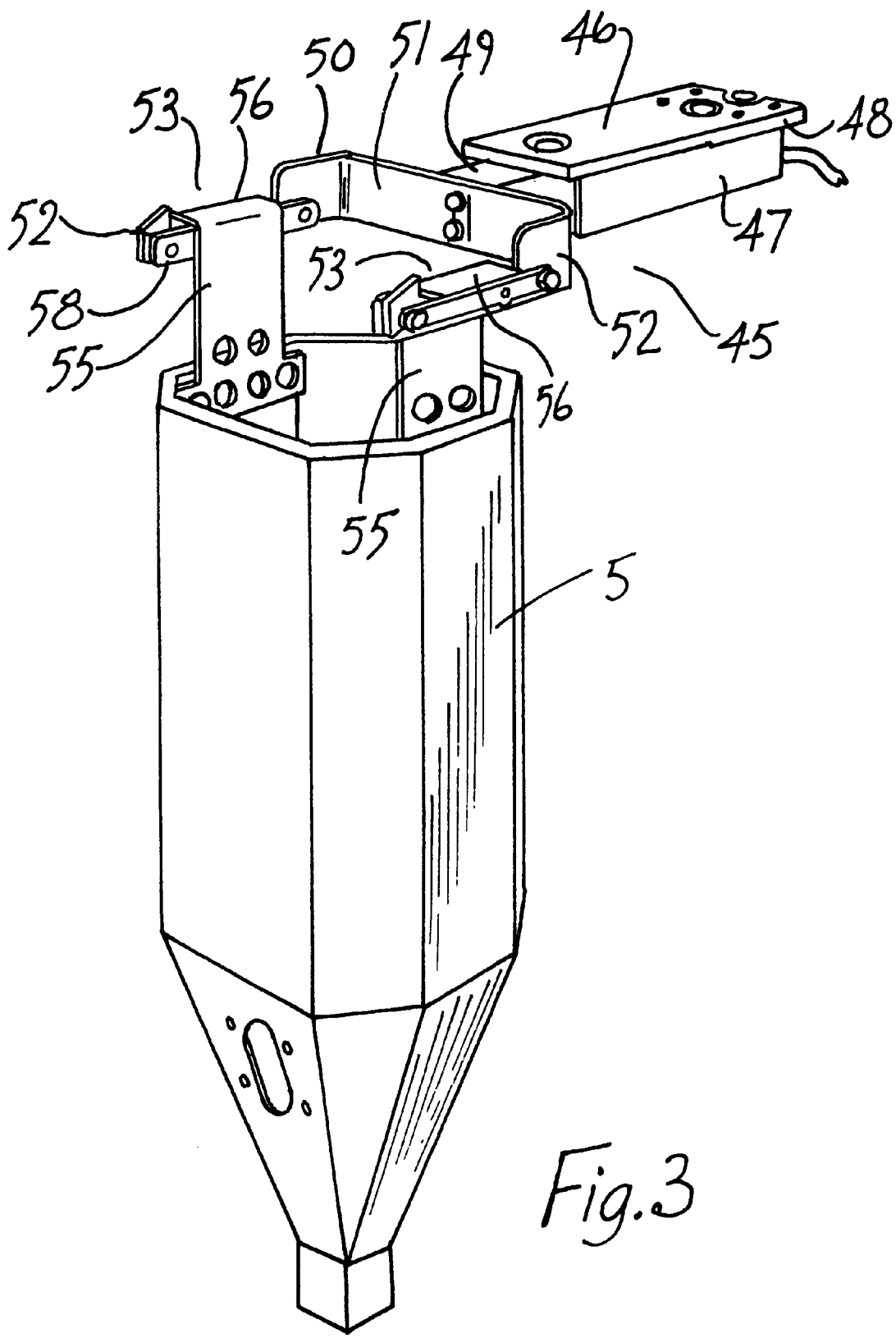
FIG. 3 is a detail perspective view showing a hopper forming portion of the apparatus.

Referring to FIGS. 3 and 4, each hopper 4, 5, 6 is suspended from the top panel 16 of the frame 2 by means of a load call assembly 45. The load cell assembly 45 comprises a mounting plate 46, an upper surface of which is secured against an underside of the top panel 16. A load cell 47 is mounted on an underside of the plate 46 at a downwardly stepped outer end 48 of the plate 46. A free outer end 49 of the load cell 47 has a hopper carrying fork 50 mounted thereon.

The hopper carrying fork 50 is of U-shaped construction having an inner end 51 attached to the load cell 47 with a pair of spaced-apart outwardly extending hopper support arms 52. Each arm 52 has a groove 53 in an upper surface of the arm 52. Each hopper 4, 5, 6 has a pair of upstanding spaced-apart hanging plates 55 extending upwardly of an upper end of the hopper 4, 5, 6. Each hanging plate 55 has an out-turned flanged upper end 56 for seating engagement within the groove 53 to suspend the hopper 4, 5, 6 on the arms 52.

An adjustment plate 58 is mounted on an inside face of each arm 52 by means of a pair of adjustment screws 59. The adjustment screws 59 pass through associated enlarged adjustment slots in the arm 52 and engage associated threaded holes in each plate 58 for adjustment of the plate 58 on the arm 52. An upper edge 60 of each adjustment plate 58 forms a support for the hopper hanging plate 55. The positioning of the adjustment plate 58 on the arms 52 can be adjusted to properly hang the hopper 4, 5, 6 from the arms 52 in a correctly balanced position. Mounted between the adjustment plate 58 and each arm 52 is a centring plate 62 having an inwardly extending pointed central lug 63 for centring the hopper between the arms 52. On an outside of the arm 52, a locking washer 65 is mounted between the adjustment screws 59, the locking washer 65 having locking tabs 66 which engage flat side faces of the locking adjustment screws 59 when the adjustment plate 58 has been set.

Referring to FIG. 4, a safety bolt 70 is mounted at an inner end 49 of the load cell 47 projecting upwardly therefrom freely passing through an associated hole in the carrier plate 46 and locating within a stepped socket 71 in the carrier plate 46 at an upper end of the hole. A head 72 of the bolt 70 is movable vertically within the socket 71 which is of greater depth than the bolt head 72 between the underside of the top panel 16 of the frame 2 to which the carrier plate 46 is attached and a stepped shoulder at a lower end of the socket 71 which define deflection limits for protecting the load cell 47.

Referring to FIG. 1, optionally reservoir hoppers 80 containing additive materials may be mounted above each hopper 4, 5, 6 with discharge from the reservoir hoppers 80 controlled by pinch or slide valves 81. A further manual slide gate 82 may also optionally be provided if desired. A control box 84 and control console 85 are mounted on opposite side walls 15 of the frame 2.

FIG. 8 shows the blending apparatus 1 in use mounted on a plastics extrusion device 10.

In use, the hoppers 4, 5, 6 are filled with additive materials. A primary additive is delivered by gravity feed from the hopper 4 through the primary additive feed pipe 20 and through the additives discharge chute 8 into the extruder 10, as shown in FIG. 8. At the same time, secondary additive materials are fed from the hoppers 5, 6, the motors 34 being controlled to regulate the quantity of secondary additive materials fed to the additives discharge chute 8. The controller for the blending apparatus 1 has means (not shown) for connection to a sensor for sensing the throughput of the extruder 10 and for regulating the throughput of material through the extruder 10 in response to the sensed discharge of material from the hoppers 4, 5, 6 to control the blend of material in the extruder 10. It will be noted from FIG. 8 that the individual additives are continuously fed directly to the material processing device, in this case the extruder 10, with blending being carried out on the extruder screw 11. It will be appreciated that in other applications, additives may be fed in similar fashion to other material processing devices such as a belt, conveyor, vibration feeder or screw feeder for example. Accurate mixing of the additive materials can be achieved as there is no opportunity for the additive materials to separate because of the continuous dosing directly to the screw 11. Each of the load cells for the hoppers 4, 5, 6 and the motors 34 for the screw feeders 25, 26 are connected to a controller (not shown) for regulating operation of the blender 1. The hoppers 3, 4, 5 are filled as required under the direction of the controller.

In an alternative arrangement the feed rates of the secondary additive materials to the additives discharge chute 8 are fixed and the rate of through put of material through the extruder is adjusted so that the rate of discharge of additive materials from the primary feed hopper 4 corresponds to the feed rates from the secondary feed hoppers 5,6 to achieve the desired ratio of additive materials and process material.

It will be appreciated that the invention advantageously provides a blending apparatus of relatively simple construction for the accurate control of the supply of additives to a material processing device. The blending apparatus is ideally suited to plastics extrusion processes, and may equally well be applied to textile, pharmaceutical, food, chemical and other manufacturing processes requiring accurate blending.

Further, the simple, robust and compact design ensures operational reliability. Also, all parts of the blender are readily easily accessed to allow rapid cleaning of screw feeders and hoppers thus minimising downtime.

Advantageously, there is no opportunity for the additive materials to separate because of the continuous dosing directly to the extruder screw or other material processing device giving an accurately proportioned supply of additive materials evenly throughout the throughput of the material processing device.

Also, advantageously as the blender operates on a continuous basis, at the end of a production run there is no pre-blended material wasted as with other systems which mix the additives prior to delivery to the material processing device.

Referring to FIG. 9, an alternative feeding means is shown. This is particularly suitable for controlling relatively low feed rates of additives, for example in the order of 40 gm/hr. The feeding means comprises a rotatable discharge cone device 100 having a conical body 101 which tapers inwardly between an inlet end 102 and an outlet end 103 of the body 101 with drive means 105 for rotation of the body 101 for discharge of material from the body 101. Material is gravity fed from an additive feed hopper 106 to the inlet end 102. Material discharged from the outlet end 103 is delivered to the discharge chute 8. Feed rate from the body 101 is determined by the speed of rotation of the body 101. The discharge cone device 100 is suspended on the load cell 47 together with the feed hopper 106, weight loss being monitored and communicated to the blender controller which varies the rotational speed of the cone body 101 to maintain a desired material feed rate.

Referring now to FIG. 10. there is shown another blending apparatus indicated generally by the reference numeral 120. The blending apparatus 120 is largely similar to the blender of FIGS. 1–8 and like parts are assigned the same reference numerals. In this case the blender 120 has an additives discharge chute 121 for reception of additives from the feed hoppers 4, 5, 6 as previously described. An outlet of the additives discharge chute 121 is connected to an inlet of a discharge auger 122 for final discharge of the additive materials from the blender 120. The speed of the auger, which is connected to the controller can be regulated to give a desired discharge rate of additives from the blender 120.

Referring now to FIG. 11. there is illustrated a feed hopper 130 similar to the feed hoppers previously described with reference to FIGS. 1–8. In this case a vibrator rod 131 is suspended from the support frame to vertically downwardly through the hopper 130. A lower end 133 of the rod 131 terminates adjacent an outlet 134 of the hopper 130. A vibrator 135 is mounted at an upper end of the rod 131 and is connected to a pneumatic or electric power source and is operable to vibrate the rod 131 within the hopper 130 to ensure free flow of material from the hopper 130.

It would be noted that the rod is mounted on the support frame rather than on the housing.

Referring now to FIG. 12 there is shown a screw shaft 140 of a screw feeder of the blenders described previously. An identity collar 142 is mounted on a drive coupling 143 at one end of the screw shaft 140. The collar 142 has a central ring 144 with a number of radial lugs 145 spaced around the ring 144. The width of each lug 145 and the spacing between the lugs is chosen to correspond to the particular screw shaft 140 on which the collar 142 is mounted. FIGS. 13–15 show three different configurations of identity collar. A reed switch (now shown) is mounted adjacent the end of the cylindrical housing 28 in which the screw shaft 140 is mounted for engagement with the lugs 145. The reed switch is connected to 2 clock generators, one associated with the width of the lugs 145 and the other associated with the gap between the lugs 145. The output of the clock generators is connected to the controller so that the controller can identify a particular screw shaft 140 irrespective of the speed of rotation of the screw shaft 140.

It will be appreciated that other types of indicating means could be used such as for example a bar code strip on the shaft with an associated optical sensor or an electromagnetic coding on the shaft and associated reeder.

Referring now to FIG. 16. there is illustrated another blender 150. In this case hoppers 151 discharge by means of screw feeders 156 into a discharge chute 157. Each screw feeder 156 is operable for a pre-set time period to deliver a desired quantity of additive material from each hopper 151 evenly over said time period into the discharge chute 157. It will be noted that each screw feeder 156 runs for the same time period, the speed of each screw feeder 156 being regulated by the controller to deliver feed additives simultaneously in the required ratios from each hopper 151 into the discharge chute 157.

The invention is not limited to the embodiments hereinbefore described which may be varied in both construction and detail.

What is claimed is:

1. A blending apparatus for controlled delivery of blend additives to a material processing device, comprising a primary additive feed hopper having an additive inlet and an additive outlet, at least one secondary additive feed hopper, each secondary additive feed hopper having an additive inlet and an additive outlet, an additives discharge chute having an inlet and an outlet, the inlet being connected to each hopper outlet, the outlet for connection to a material processing device, each hopper having means for delivery of additives from the hopper to the inlet of the discharge chute, means for sensing discharge of additives from each hopper, each sensing means being adapted to be connected to a controller, a controller being operable for regulating simultaneous discharge of additive material from selected hoppers in a preselected ratio to the additives discharge chute, the means for sensing discharge of additives from each feed hopper being a load cell mounted on a support frame, the feed hopper being hung from a cantilevered hopper carrying fork mounted on the load cell, the hopper carrying fork being U-shaped having an inner end attached to the load cell with a pair of spaced-apart outwardly extending hopper support arms, each arm having a groove in an upper surface of the arm, each hopper having a pair of spaced-apart hanging plates mounted at an upper end of the hopper, and each hanging plate having an out-turned flanged upper end for engagement within the groove to suspend the hopper on the arms.

2. Apparatus as claimed in claim 1 wherein one or more of the hoppers has a vibrator rod suspended within the hopper, the rod having associated vibrator means operable to vibrate the rod within the hopper.

3. Apparatus as claimed in claim 1 wherein an adjustment plate is mounted on each arm by means of adjustment screws which pass through complementary adjustment slots in the arm and engage threaded holes in the adjustment plate for adjustment of the adjustment plate on the arm, an upper edge of each adjustment plate forming a support for the hopper hanging plate.

4. Apparatus as claimed in claim 1 wherein a centring plate is mounted on each arm having an inwardly extending central lug for engaging the hanging plates for positioning the hopper between the arms.

5. Apparatus as claimed in claim 1 wherein the load cell is mounted on a bottom face of a carrier plate, a top face of the carrier plate abutting a horizontal support surface on the support frame to which the carrier plate is secured, the load cell having a fixed inner end attached to the carrier plate and a free outer end on which the hopper carrying fork is mounted, a safety bolt being mounted at a free end of the load cell and housed within an associated stepped socket in the carrier plate, a head of the bolt movable vertically within the socket between the horizontal support surface and a stepped shoulder in the socket defining deflection limits for the load cell.

6. Apparatus as claimed in claim 1 wherein a low level sensor is mounted in the additives discharge chute, the low level sensor being adapted to be connected to the controller, the controller operating the delivery means at selected hopper outlets for delivering a preset charge of additives to the discharge chute in response to a sensed low level in the additives discharge chute, the controller operating each delivery means for a preset time period and varying the speed of each delivery means for simultaneously delivering selected quantities of additives from the hoppers to the additives discharge chute in a preselected desired ratio.

7. A blending apparatus for controlled delivery of blend additives to a material processing device, comprising:
   a primary additive feed hoper,
   at least one secondary additive feed hopper,
   an additive discharge chute having an outlet for connection to the material processing device,
   the primary additive feed hopper being mounted above the additives discharge chute for continuous gravity feed of additive material thereto,
   a secondary feeding means being connected between each secondary feed hopper and the additives discharge chute for delivery of feed additive from the secondary feed hopper to the additives discharge chute,
   means for sensing the throughput of material in the material processing device,
   means for sensing the discharge of additives from the feed hoppers,
   a controller adapted to be connected to the means for sensing the throughput of the material processing device and to the means for sensing the discharge of additives from the feed hoppers,
   the controller including means for regulating the throughput of material through the material processing device in response to the sensed discharge of material from the feed hoppers.

8. A blending apparatus as claimed in claim 7, wherein a primary additive feed pipe communicates between an outlet of the primary additive feed hopper and the additives discharge chute, said primary additive feed pipe having an outlet end which extends into the additives discharge chute and in which each secondary feeding means has an outlet end terminating within the additives discharge chute between an exterior of the primary additive feed pipe and an interior of the additives discharge chute.

9. Apparatus as claimed in claim 7, wherein one or more of the hoppers has a vibrator rod suspended within the hopper, the rod having associated vibrator means operable to vibrate the rod within the hopper.

10. Apparatus as claimed in claim 7, wherein the means for sensing discharge of additives from each feed hopper is a load cell mounted on a support frame, the feed hopper being hung from a cantilevered hopper carrying fork mounted on the load cell, the hopper carrying fork being U-shaped having an inner end attached to the load cell with a pair of spaced-apart outwardly extending hopper support arms, each arm having a groove in an upper surface of the arm, each hopper having a pair of spaced-apart hanging plates mounted at an upper end of the hopper, each hanging plate having an out-turned flanged upper end for engagement within the groove to suspend the hopper on the arms.

11. Apparatus as claimed in claim 10, wherein an adjustment plate is mounted on each arm by means of adjustment screws which pass through complementary adjustment slots in the arm and engage threaded holes in the adjustment plate for adjustment of the adjustment plate on the arm, an upper edge of each adjustment plate forming a support for the hopper hanging plate.

12. Apparatus as claimed in claim 10, wherein a centering plate is mounted on each arm having an inwardly extending central lug for engaging the hanging plates for positioning the hopper between the arms.

13. Apparatus as claimed in claim 10, wherein the load cell is mounted on a bottom face of a carrier plate, a top face of the carrier plate abutting a horizontal support surface on the support frame to which the carrier plate is secured, the load cell having a fixed inner end attached to the carrier plate and a free outer end on which the hopper carrying fork is mounted, a safety bolt being mounted at a free end of the load cell and housed within an associated stepped socket in the carrier plate, a head of the bolt movable vertically within the socket between the horizontal support surface and a stepped shoulder in the socket defining deflection limits for the load cell.

14. Apparatus as claimed in claim 7, wherein each secondary feeding means comprises a screw feeder having a screw shaft rotatably mounted within a cylindrical housing extending radially outwardly from the additives discharge chute, the screw shaft having a drive head at an outer end of the screw shaft engaged by a complementary motor drive head on a drive motor for the shaft, the drive heads being releasably engageable.

15. Apparatus as claimed in claim 14, wherein the motor is movable between an engaged position for driving the screw shaft and a retracted disengaged position.

16. Apparatus as claimed in claim 15, wherein the motor is hingedly mounted on the housing adjacent the outer end of the screw shaft for movement between the engaged and disengaged position.

17. Apparatus as claimed in claim 7, wherein the feeding means comprises a rotatable discharge cone device, having a conical body which tapers inwardly between an inlet end and an outlet end of the body with drive means for rotation of the body, the inlet end for reception of material from the secondary additive feed hopper and the outlet end communicating with the additives discharge chute.

18. Apparatus as claimed in claim 17, wherein the discharge cone device is mounted on the load cell together with the feed hopper.

19. Apparatus as claimed in claim 7, further comprising means for identifying the feed means associated with a hopper, said identifying means being connected to the controller.

20. Apparatus as claimed in claim 19, wherein in the feeding means is a screw feeder having a screw shaft rotatably mounted within a cylindrical housing and the identifying means is an identity means of the screw shaft corresponding to the screw shaft and a complimentary sensor connected to the controller and mounted adjacent the screw shaft for co-operation with the identity means to indicate to the controller which screw shaft is mounted in the housing.

* * * * *